United States Patent [19]

Nuber et al.

[11] Patent Number: 4,795,802

[45] Date of Patent: Jan. 3, 1989

[54] REMOVAL OF VINYLPYRROLIDONE FROM VINYLPYRROLIDONE POLYMERS

[75] Inventors: Adolf Nuber, Boehl-Iggelheim; Axel Sanner, Frankenthal; Dieter Urban, Mannheim, all of Fed. Rep. of Germany

[73] Assignee: BASF Aktiengesellschaft, Ludwigshafen, Fed. Rep. of Germany

[21] Appl. No.: 82,140

[22] Filed: Aug. 6, 1987

[30] Foreign Application Priority Data

Sep. 3, 1986 [DE] Fed. Rep. of Germany ....... 3629933

[51] Int. Cl.$^4$ ................................................. C08F 6/10
[52] U.S. Cl. ................................. 528/482; 528/490; 210/690; 210/694
[58] Field of Search ............... 528/482, 490; 523/310; 585/831; 210/690, 694; 526/263

[56] References Cited

U.S. PATENT DOCUMENTS

| | | | |
|---|---|---|---|
| 2,665,271 | 1/1954 | Beller | 528/491 |
| 2,810,714 | 10/1957 | Price | 528/501 X |
| 4,182,851 | 1/1980 | Straub et al. | 528/491 |
| 4,636,540 | 1/1987 | Warfel | 528/482 X |

FOREIGN PATENT DOCUMENTS 0936101 9/1963 United Kingdom ............... 528/482

OTHER PUBLICATIONS

Chem. Abstr. 96(2): 7529v.

Primary Examiner—Joseph L. Schofer
Assistant Examiner—F. M. Teskin
Attorney, Agent, or Firm—Keil & Weinkauf

[57] ABSTRACT

Vinylpyrrolidone is removed from its polymers by a process in which an aqueous or alcoholic solution of the polymer is treated with an adsorbent, the adsorbents used preferably being active carbon, zeolites and especially acidic ion exchangers.

4 Claims, No Drawings

REMOVAL OF VINYLPYRROLIDONE FROM VINYLPYRROLIDONE POLYMERS

The present invention relates to a process for the removal of vinylpyrrolidone (VP) from homopolymers and copolymers of VP by treating an aqueous or alcoholic solution of the polymer with an adsorbent.

Particularly for toxicological and aesthetic reasons (odor), polymer should in principle be as free as possible of monomers. This applies in particular to polymers for cosmetic and, especially, pharmaceutical applications.

The conventional methods for reducing the monomer content in VP polymers, concentrate on postpolymerization after the end of the main polymerization, by subsequently adding initiators and/or increasing the temperature (U.S. Pat. Nos. 2,665,271 and 4,182,851). No other methods are known for VP polymers. The method results in a higher content of secondary products of the initiator in the polymer. Moreover, discoloration readily occurs at elevated temperatures.

It is an object of the present invention to provide a process for obtaining a VP polymer having a very low monomer content, the said process avoiding the stated disadvantages.

We have found that this object is achieved by a process for removing VP from VP polymers, wherein an aqueous or alcoholic solution of the polymer is treated with an adsorbent.

VP polymers are homopolymers and copolymers of VP which contain not less than 20, preferably not less than 30, % by weight of VP as copolymerized units. They can be prepared by any desired method, in water and/or an organic solvent. The K value according to Fikentscher (Cellulose-Chemie 13 (1932), 58–64 and 71–74) should be from 10 to 100.

Suitable comonomers are any conventional ones, for example vinyl esters of carboxylic acids of 1 to 4 carbon atoms, such as vinyl acetate or vinyl propionate, vinyl ethers, acrylates and methacrylates of alcohols of 1 to 8 carbon atoms, such as methyl methacrylate or 2-ethylhexyl acrylate, where the alcohol may still carry free hydroxyl groups, e.g. hydroxypropyl acrylate, and acrylic acid and methacrylic acid. Of course, the copolymerization is not restricted to one comonomer; instead, it is also possible for two or more comonomers to be present as copolymerized units.

In the treatment with the adsorbent, the polymer may be present in aqueous, aqueous/alcoholic or alcoholic solution. Suitable alcohols are those of 1 to 4 carbon atoms. Water is preferred.

Particularly suitable adsorbents are active carbon, zeolites and especially acidic ion exchangers. There are various active carbons (Ullmann Encyklopädie der techn. Chemie, 4th Edition, Verlag Urban und Schwarzenberg, Munich-Berlin, 1977, Volume 14, 620–633), zeolites (Ullmann, 4th Edition, Volume 24, 575–578) and ion exchangers (Ullmann, 4th Edition, Volume 13, 279–346). All of them are suitable in principle. Strongly acidic (i.e. sulfo-containing) ion exchangers (Ullmann, Volume 13, 297–298) are preferred, particularly the macroporous ones (pore diameter 10 nm or more; Ullmann, 4th Edition, Volume 13, 296). The adsorbent can be used as a fixed bed or suspended in finely divided form in the solution. The minimum contact time is about 1 minute. As a rule, the contact times in our experiments were from 4 minutes to 15 hours. The temperature during contact may vary within wide limits but is preferably from 10° to 90° C.

Advantageously, the adsorbent is used in an amount such that either the VP extraction is sufficient for the intended purpose, or an increase in the amount has no significant additional effect. The amount depends to a great extent on the type of adsorbent and should be determined in each case by simple experiments. For active carbon, it is about 1–20% by weight, for zeolites from 3 to 25% by weight and for acidic ion exchangers from 0.1 to 15% by weight, the percentages in each case being based on polymer. This gives residual VP contents of from 250 to below 10 ppm, based on the polymer.

The upper limit of the concentration of the solution to be treated is determined by the viscosity, which in turn depends on the molecular weight. For example, the concentration may be from 20 to 40% by weight for a K value of about 30.

The pH of the polymer solution before the treatment with the adsorbent is not critical; advantageously, the pH resulting from the polymerization (about 4–9) is retained. If the polymer solution is free of salts and bases, the pH does not change substantially during treatment with the adsorbents, including the acidic ion exchangers. In the case of polymer solutions containing salts and/or acids, the treatment with an acidic ion exchanger gives acidic solutions. These may be neutralized by adding a base, preferably by treatment with a basic ion exchanger, in order to avoid the introduction of salts into the solution.

The novel process is surprising since it was expected that adsorbents would preferentially bind the large molecules from a mixture of large and small molecules (high molecular weight and low molecular weight compounds). However, it could not be foreseen that it would be possible to remove the low molecular weight components in this manner.

In the Examples, parts and percentages are by weight. The residual monomer contents are based on the polymer.

EXAMPLE 1

A 30% strength aqueous solution of polyvinylpyrrolidone (K value 30.1, measured as a 1% strength solution in water at 25° C.) was passed at a rate of 4 bed volumes per hour over a commercial ion exchanger column filled with a regenerated, macroporous, strongly acidic ion exchanger (®Lewatit SPC 118). The vinylpyrrolidone content was reduced from 980 ppm to 20 ppm by this process.

EXAMPLE 2

10 parts of active carbon (large-pore, mean pore diameter 0.8–3 nm) were added to a solution of 100 parts of polyvinylpyrrolidone (K value 31.4, measured as a 1% strength solution in water at 25° C.) in 300 parts of water (pH of the solution 72), the mixture was stirred for 4 hours at 25° C. and the adsorbent was then separated off.

The residual content of vinylpyrrolidone monomer decreased from an initial value of 600 ppm to 28 ppm.

EXAMPLE 3

A 35% strength aqueous solution of a copolymer of 60 parts of vinylpyrrolidone and 40 parts of vinyl acetate (K value 28.3, measured as a 1% strength solution in ethanol at 25° C.) was passed, at a rate of 7 bed volumes per hour and at 50° C., over a commercial ion exchanger column which was filled with a regenerated, macroporous, strongly acidic ion exchanger (Lewatit SPC 118).

Both the untreated solution and the solution treated as described above were spray-dried. The VP content of the untreated copolymer was 1,020 ppm, while that of the treated one was less than 10 ppm.

EXAMPLE 4

A 25% strength solution in isopropanol of a copolymer of 30 parts of vinylpyrrolidone and 70 parts of vinyl acetate (K value 25.3, measured as a 1% strength solution in ethanol at 25° C.) flowed at a rate of 10 bed volumes per hour over a commercial ion exchanger column which was filled with a regenerated, macroporous, strongly acidic ion exchanger (Lewatit SPC 118).

The VP content of the starting solution was 590 ppm, while that of the treated solution was 20 ppm.

EXAMPLE 5

5 parts of active carbon (for gas chromatography, mean pore diameter 0.5–1.5 nm) were suspended in 500 parts of a 20% strength aqueous solution of polyvinylpyrrolidone (K value 35.5, measured as a 1% strength solution in water at 25° C.). This suspension was stirred for 6 h at 25° C., after which the adsorbent was separated off. The VP content was reduced from an initial value of 300 ppm to 23 ppm by this process.

EXAMPLE 6

15 parts of the 1 nm molecular sieve were added to a solution of 100 parts of polyvinylpyrrolidone (K value 23.9, measured as a 1% strength solution in water at 25° C.) in 300 parts of water (pH of the solution 5). This suspension was stirred for 5 h at 25° C., after which the molecular sieve was separated off. Both the untreated solution and the solution treated as described above were spray-dried. The VP content of the untreated polymer was 530 ppm while that of the treated one was 240 ppm.

EXAMPLE 7

3 parts of a regenerated, macroporous, weakly acidic ion exchanger (Lewatit CNP 80) were suspended in 300 parts of a 30% strength aqueous solution of polyvinylpyrrolidone (K value 28.6, measured as a 1% strength solution in water at 25° C.). This mixture was then stirred for 2 h at 50° C., after which the ion exchanger was separated off. As a result of this treatment of the polymer solution, the VP content decreased from an initial value of 330 ppm to 90 ppm.

EXAMPLE 8

A 25% strength aqueous solution of polyvinylpyrrolidone (K value 31.4, measured as a 1% strength solution in water at 25° C.) flowed at a rate of 3 bed volumes per hour over a commercial ion exchanger column which was filled with a regenerated, strongly acidic ion exchanger (Lewatit S 100).

The polymer solution was spray-dried. The VP content decreased from an initial value of 600 ppm to 39 ppm.

We claim:

1. A process for removing vinylpyrrolidone from its polymers, wherein an aqueous or alcoholic solution of the polymer is treated with an adsorbent selected from the group consisting of active carbon, a zeolite and an acidic ion exchanger.

2. The process of claim 1, wherein the adsorbent used is active carbon.

3. The process of claim 1, wherein the adsorbent used is a zeolite.

4. The process of claim 1, wherein the adsorbent used is an acidic ion exchanger.

* * * * *